Jan. 16, 1940.  O. R. BRANDENBURG  2,187,260
MATRIX
Filed March 23, 1936
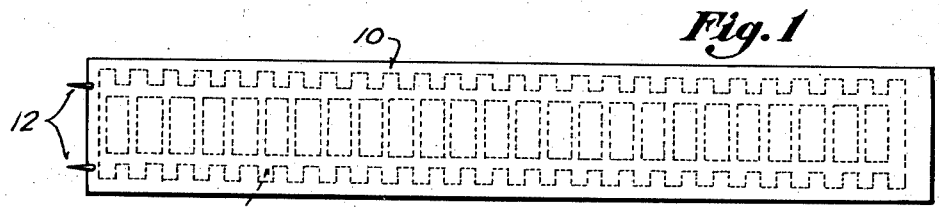
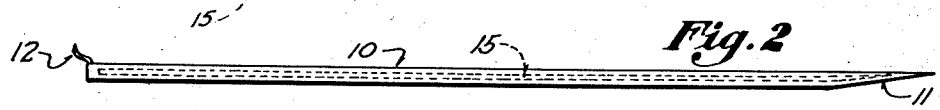
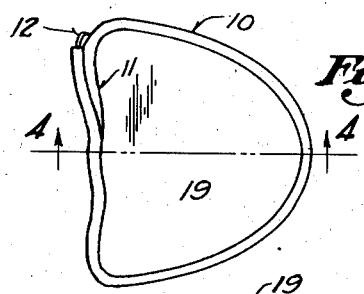 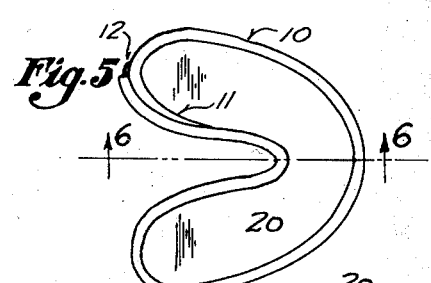
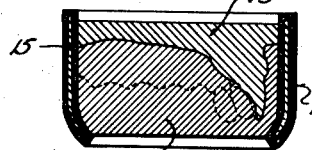 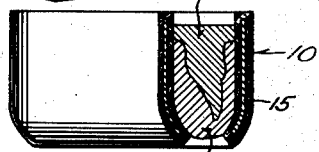
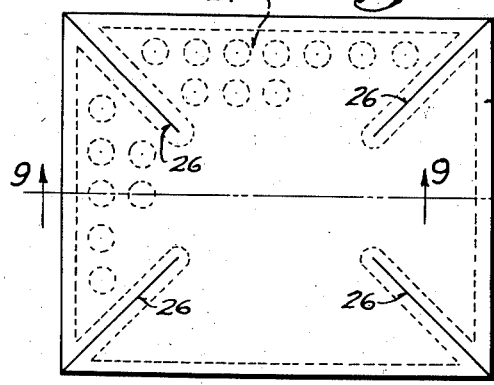 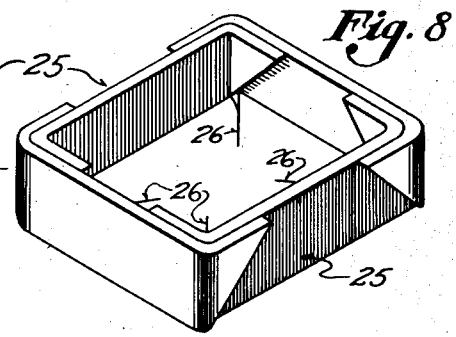
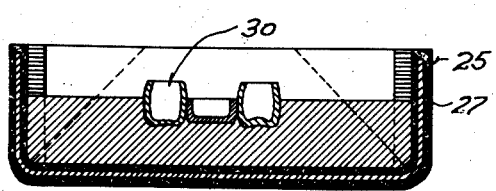
INVENTOR.
Oscar R. Brandenburg
BY Eugene H. Simpson
ATTORNEYS.

Patented Jan. 16, 1940

2,187,260

UNITED STATES PATENT OFFICE 2,187,260

MATRIX

Oscar R. Brandenburg, Milwaukee, Wis.

Application March 23, 1936, Serial No. 70,249

7 Claims. (Cl. 18—34.1)

This invention relates to mechanical dentistry and more particularly to a matrix for making models of a mouth or portion thereof and for forming a box for investment compound.

One object of the invention is to provide a matrix which will readily assume the shape of various impressions and hold the shape during the formation of a model.

A further object is to provide a variable size investment box for making models, soldering bridges, and for various other uses.

Another object is to provide a matrix which will conform exactly to the shape of any impression and which may be used repeatedly.

Further objects are to reduce the time and cost of making models in dental work, and to simplify the setting up work in model making.

Other objects will become apparent upon consideration of the following description.

Two embodiments of the invention are illustrated in the accompanying drawing, in which:

Fig. 1 is a plan view of a matrix made in accordance with the present invention;

Fig. 2 is a side view of the matrix shown in Fig. 1;

Fig. 3 is a plan view of the matrix shown in Fig. 1, as applied to an impression of the upper jaw;

Fig. 4 is a cross-section on the line 4—4 of Fig. 3;

Fig. 5 is a plan view of the matrix showing it applied to an impression of the lower jaw;

Fig. 6 is a cross-section on the line 6—6 of Fig. 5;

Fig. 7 is a plan view of a matrix for use as an investment box;

Fig. 8 is a view of the matrix shown in Fig. 7, showing it bent up to form an investment box of the desired size; and Fig. 9 is a cross-section on the line 9—9 of Fig. 7, showing the box bent up and containing a bridge which is in position for soldering in an investment compound.

Referring to the drawing, in which like numerals designate like parts throughout the several views, and referring particularly to Figs. 1 to 6 inclusive, the matrix box is shown as composed of a strip 10 of soft flexible material such as rubber, tapered at one end as shown at 11, and provided with one or more fastening hooks 12 at the opposite end from the taper. The hooks have sharp points which project into the side of the rubber to hold the ends together as shown clearly in Figs. 3 and 5.

A perforated core 15 of soft ductile material is embedded in the strip 10. The core 15 is designed to be flexible enough to permit the matrix to be readily bent around sharp corners and so cause the soft material of the strip to make a tight joint with such corners, and heavy enough to overcome any resilient tendency of the rubber or other material of the strip 10 to assume its original shape. The material of the strip 10 is fused through the perforations of the core 15 to form a monolithic unit.

In practice it has been found that sponge rubber forms a very satisfactory material for the outer strip 10, that lead is best suited for the core 15, and copper, steel or other metal may be used for the hooks 12. It is to be understood that this invention is not limited to these materials, but that they are merely suggestive of what may be used.

In use, an impression 17 of the upper jaw, as shown in Figs. 3 and 4, or an impression 18 of the lower jaw, as shown in Figs. 5 and 6, may be taken, and a matrix box may be formed by wrapping the matrix shown in Figs. 1 and 2 around either of the impressions 17 or 18. The box thus formed is then filled with plaster of Paris or other suitable molding material and placed on a vibrating table to suitably tamp it. After the molding compound is thoroughly set the wax of the impressions 17 or 18 is removed giving a perfect model 19 or 20 of the upper or lower jaw, respectively.

A second type of matrix is shown in Figs. 7, 8 and 9. Referring to these figures, it will be seen that the matrix comprises a rectangular strip 25 of soft flexible material cut diagonally inward from the four corners as shown at 26 and having a perforated core 27 embedded in the material 25. The core 27 is spaced inwardly from the edges of the strip 25 and from the cuts 26.

The same material may be used for this matrix as for the one shown in Figs. 1 and 2.

In using this matrix the four edges of the strip 25 are bent up to form a rectangular box such as is shown in Fig. 8. The box may be used for forming a mouth model of plaster of Paris similar to the models 19 and 20 shown in Figs. 3 to 6 inclusive, or the box may be filled with investment compound for soldering a bridge 30 in the manner shown in Fig. 9.

It will be noted, in respect to the matrix shown in Figs. 1 and 2, that it readily adheres to the side of the impression and conforms to any small irregularities of the impression. After use the matrix may be stripped off the finished model and reused an indefinite number of times.

The matrix shown in Figs. 7, 8 and 9 may be formed into any size box desired with a self-contained bottom, and may be used for a variety of purposes.

Having thus described the invention it will be apparent that it is susceptible to various changes and modifications of both form and material. It is not therefore desired to limit the invention to the particular form herein shown and described, but only by the scope of the appended claims.

What is claimed as new and desired to secure by Letters Patent is:

1. A matrix, comprising, a strip of soft flexible material and a strip of ductile material embedded in said flexible material, said strips being adapted to be shaped around the periphery of an impression or the like and to form therewith a mold, said strip of ductile material being of sufficient stiffness to cause the matrix to retain the shape of the periphery of the impression during the casting operation in the mold.

2. A matrix, comprising, a strip of soft flexible material and a perforated strip of ductile material embedded in the first named strip with the material of the first strip fused together through said perforations, said strips being adapted to be shaped around the periphery of an impression or the like and to form therewith a mold, said perforated strip being of sufficient stiffness to cause the matrix to retain the shape of the periphery of the impression during the casting operation in the mold.

3. A matrix, comprising, a strip of soft flexible material a strip of ductile material embedded in said first named strip, said strips being adapted to be shaped to conform to the periphery of an impression or the like and to form therewith a mold, said flexible strip having a tapered end to permit the strip to conform closely to the impression at all points, and said strip of ductile material being of sufficient stiffness to cause the matrix to retain the shape of the periphery of the impression during the casting operation in the mold.

4. A matrix, comprising, a strip of soft flexible material a strip of ductile material embedded in said flexible material, said strips being adapted to be shaped to conform to the periphery of an impression or the like and to form therewith a mold, said strip of ductile material being of sufficient stiffness to cause the first strip to retain the shape of the periphery of the impression during the casting operation in the mold, and means to retain the matrix on the impression.

5. A matrix, comprising, a strip of soft flexible material a strip of ductile material having perforations therein embedded in said flexible strip with the material of the flexible strip extending through said perforations, said strips being adapted to be shaped to conform to the periphery of an impression or the like and to form therewith a mold, said strip of flexible material having a tapered end to permit the strip to conform closely to the impression at all points, said strip of ductile material possessing sufficient thickness to cause the matrix to retain the shape of the periphery operation in the impression during the casting of the mold, and means to retain the matrix on the mold.

6. A matrix of the character described comprising a strip of soft flexible material and a strip of ductile material embedded therein, said strips having a plurality of cuts extending through said materials toward the central portion thereof to enable the matrix to be shaped to a desired form.

7. A matrix of the character described comprising a strip of soft flexible material and a perforated strip of ductile material embedded in said flexible material with the flexible material passing through said perforations, said strips having cuts through both materials extending toward the central portion of said strips for the purpose set forth.

OSCAR R. BRANDENBURG.